Oct. 16, 1923.

P. K. JONES 1,471,267

SHOCK ABSORBER

Filed June 3, 1921

2 Sheets-Sheet 1

Fig. T.

Inventor

Paul K. Jones,

By H L Woodward

Attorney

Oct. 16, 1923.
P. K. JONES
1,471,267
SHOCK ABSORBER
Filed June 3, 1921
2 Sheets-Sheet 2
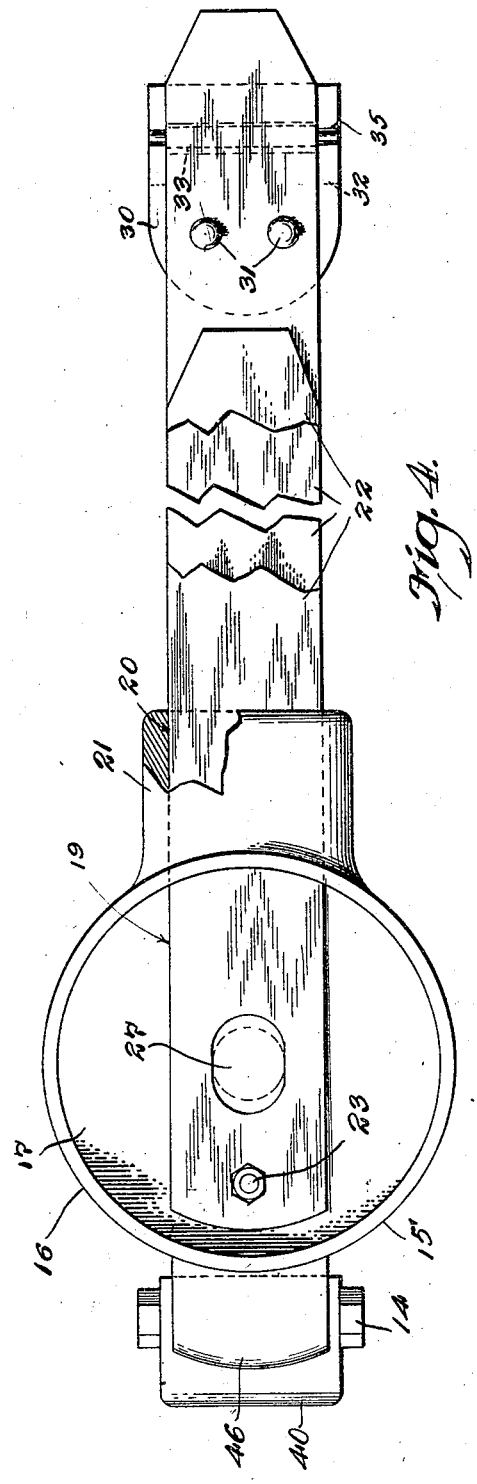
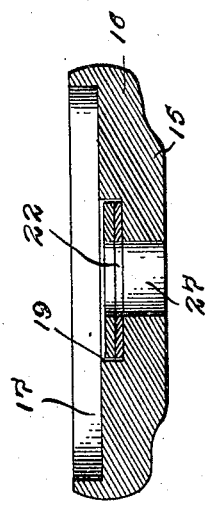
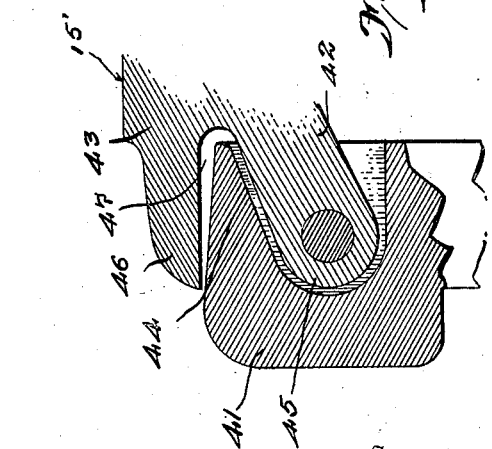
Inventor
Paul K. Jones,
By H. Woodward
Attorney Patented Oct. 16, 1923.

1,471,267

UNITED STATES PATENT OFFICE.

PAUL K. JONES, OF CLINTON, MISSOURI.

SHOCK ABSORBER.

Application filed June 3, 1921. Serial No. 474,626.

*To all whom it may concern:*

Be it known that I, PAUL K. JONES, a citizen of the United States, residing at Clinton, in the county of Henry and State of Missouri, have invented certain new and useful Improvements in Shock Absorbers, of which the following is a specification.

The invention relates to spring suspension in motor vehicles and especially that type in which an auxiliary appliance is incorporated to function between the ordinary spring and its perches. It also aims to effect improvements in lever elements pivoted upon the axle bearing at its outer end upon an intermediate portion of the ordinary spring, and having the end of the ordinary spring resiliently supported by the lever element.

It is a specific aim of my invention in such devices as indicated to attain an intermediate spring suspension operative between the auxiliary spring for absorbing extremely light shocks, and the regular spring adapted to function efficiently to neutralize the effect of great undulations in a roadway encountered by the vehicle. It is a further special aim to so construct such device as to reduce shock incident to lateral concussion upon the wheels of the vehicle. A further aim is to provide improvements in the structural details of such apparatus. Another aim is to so construct the appliance that it serves as a snubber to rebound action, at the same time that the before mentioned desirable ends are attained without complication of the production of such an appliance. It is also an aim to enable the construction of such an appliance at a low expense.

Figure 1:
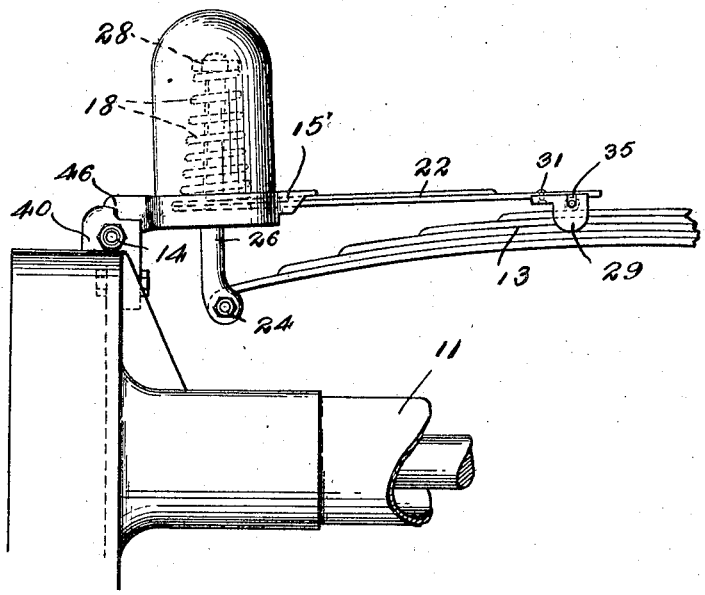
Figure 3:
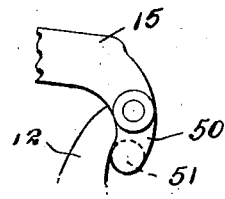
Figure 3:
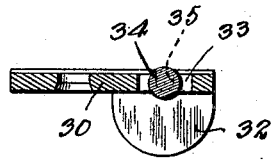
Figure 2:
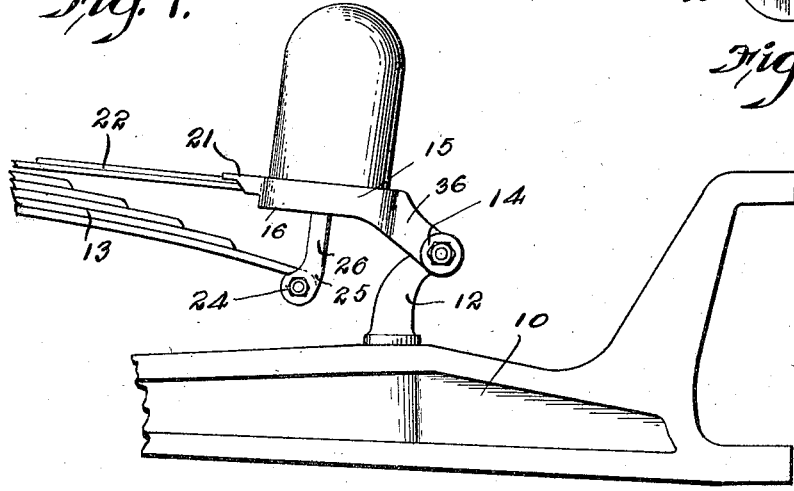

Additional objects, advantages and features of invention will become apparent in the construction, arrangement and combination of parts involved, one embodiment of the invention being described hereinafter and shown in the drawings, wherein, Figure 1 is an elevational view of a rear axle assembly at one side, Fig. 2 is a similar view of the front axle assembly, Fig. 3 is a detail of the spring shackle, Fig. 4 is a detail top view of the auxiliary spring with parts removed, Fig. 5 is a fragmentary cross section of the mounting of the spring lever thereon, Fig. 6 is a cross sectional view of the said mounting, Fig. 7 is a fragmentary sectional view of the mounting means and relation of the spring thereto.

There is illustrated a part of the running gear of a motor vehicle of a type very largely used at the present time, including a front axle 10, and a rear axle 11. The front axle 10 is fitted with a spring perch 12 which is ordinarily inclined inwardly from the upper side of the axle and connected to the ends of the spring 13, by a spring shackle of familiar form which is dispensed with. I utilize the same perch, but reverse its position, by giving it a half turn so that it inclines outwardly. Upon the perch there is pivoted by the shackle bolt 14, a base lever 15, adapted to be drop-forged or cast, affording a mounting for a lever spring 22 and coil spring 18 to be described. The base member 15 is formed with a circular enlargement 16, recessed on its upper side to afford a seat for a conical coil spring 18, the size of which is properly proportioned to the service contemplated. A channel 19 is formed centrally across the recess 17, opening through a slot 20 in the inner side of the base piece 15, and an extension 21 is formed upon the upper part of the base, over the slot and extending inwardly from the base a distance, so as to bear upon the lever spring 22, which is inserted through the slot and extended across the recess in the channel, secured at its extremity in the recess by a bolt 23, as shown in Fig. 4. The spring 13 is connected by a shackle bolt 24 to a hanger yoke 25 having a shank 26 extended slidably through apertures in the base and the spring 22, as shown at 27, its upper end being provided with a collar 28 set upon the upper end of the spring 18. The openings at 27 in the base piece 15 are of a size to limit movement of the shank 26 longitudinally of the axle 10, and to prevent fore and aft movement of the shank, in such manner that the shank may have a certain amount of oscillating movement in a plane with the axle, resisted by the spring 18. The outer end of the lever spring has secured thereon a saddle fitting 29 consisting of a body plate 30 upon which the outer end of the spring rests, secured thereto by a rivet or other fastening 31. The outer part of the plate 30 is provided with dependent ears 32 arranged to engage upon the front and rear sides of the spring 13, and the plate is suitably slotted, as indicated at 33 to receive an anti-friction roller 34 having trunnions engaged in slots 35 in the ears 32, whereby it is supported against loss or casual disengagement. The slots 33 and 35 are of a size to permit proper movement of the roller 34 in bearing between the springs 13 and 22. The spring 22 may be made of a number of leaves if desired, two being shown in the present instance, though the number may be varied as found desirable.

The perch 40 at the rear is constructed to provide a boxing 41 (see Fig. 5) within which the pivot lug 42 of the base 15 may be inserted and pivoted upon the shackle bolt of the base. The forward base 15 is preferably provided with two ears 36 embracing the upper end 12 of the perch and receiving the shackle bolt 14 therethrough. The construction of the two devices may otherwise be the same, with the exception that it may be found preferable to make one slightly heavier than the other. In the present instance, the boxing 41 is formed with a top bar 44 extending thereacross over the barrel element 45 of the lug 42, by which the base element of the rear auxiliary is pivoted upon the axle. The lug 43 is formed with a lip 46, which extends over the bar 44, and is arranged to bear thereupon when the base element 15′ is at the upper limit of its movement. The recess 47 formed under the lip 46 snugly receives the bar 44 of the perch, whereby the latter engaging in the recess will also aid in stopping upward movement of the base member 15′.

If desired, the base elements for the front auxiliary may be provided with an extension 50, as shown in Fig. 7, formed with a cross bar 51 located so as to strike the outer side of the perch 12 when the member 13 is moved pivotally to the upper limit of its movement.

In the operation of the device, a sidethrust from the axle will cause the saddle element to slide inwardly this movement being gradually resisted by the spring 18, as soon as the sides of the openings 27 bear against the shank 26. Light shocks and vibrations transmitted from the roadway to the axle will be absorbed by the spring 18 ordinarily, which is so constructed that its movement will have narrow limits, and when this spring 18 is compressed to its limit, the pressure transmitted through the hanger will be sustained upon the base element and transmitted to the lever spring 22. This spring will be of considerably lighter construction than the leaves of the regular spring 13, and will flex to a limited extent, but owing to the application of force close to the fulcrum represented by the shackle bolt 14, the pressure therein will be severe, although, the action of the spring will be such that the secondary shocks occuring during severe flexing of the spring 13 will be absorbed and equalized.

When the spring 22 is flexed, and during such flexure, the spring 13 will also function to an extent increasing proportionately as flexure of the spring 22 progresses. When, after severe flexure of the spring 13, the latter rebounds, and a tendency to throw the body of the vehicle above its normal position occurs, with the construction of mounting in relation to the perch shown in Figures 5 and 7, the spring 22 will engage the intermediate part of the spring 13 and oppose upward movement thereof beyond the predetermined normal position at which this function shall end.

It will be readily understood that the foregoing device is adapted to be produced economically in accordance with well known practices familiar in the art, whereby it is adapted to be interchanged and interposed with and between the ordinary shackle spring and perches of the ordinary vehicle, without requiring modification of the axle or the ordinary spring. It will also be seen that a device functioning in a novel way for the attainment of new ends in such device is provided, and that the parts are of such form as to be of great durability and liable in a minimum degree to derangement. The parts will also require a minimum of care for maintenance.

What is claimed is:

In a device of the character described, a perch, a lever pivoted thereon having an intermediate circularly recessed enlargement having a channel longitudinally thereacross and a slot through the outer side forming a continuation of the channel, a leaf spring forming a continuation of the lever set in said channel and projected through said slot a distance, said spring and lever having longitudinal slots formed therethrough centrally of the recess, means to secure the spring in the lever, a helical spring mounted concentric with said recess, a bolt supported on the upper end of the spring and projected slidably through the slots, and having limited oscillation therein, and a main leaf spring hung upon the lower end of the bolt, said first named spring bearing at its outer end upon an intermediate part of the last named spring.

In testimony whereof I have affixed my signature in presence of two witnesses.

PAUL K. JONES.

Witnesses:
  W. N. ABNEY,
  W. W. HUEY.